(12) United States Patent
Bontjer et al.

(10) Patent No.: US 11,051,521 B2
(45) Date of Patent: Jul. 6, 2021

(54) METHOD AND DEVICE FOR APPLYING A CONSUMABLE TREATING LIQUID TO AN INDIVIDUAL MEAT PRODUCT, SUCH AS A SAUSAGE

(71) Applicant: Marel Further Processing B.V., Boxmeer (NL)

(72) Inventors: Marcus Bernhard Hubert Bontjer, Aarle-Rixtel (NL); Frank Johannes Antonius van den Heuij, Gennep (NL)

(73) Assignee: Marel Further Processing B.V., Boxmeer (NL)

( * ) Notice: Subject to any disclaimer, the term of this patent is extended or adjusted under 35 U.S.C. 154(b) by 212 days.

(21) Appl. No.: 16/318,857

(22) PCT Filed: Jul. 19, 2017

(86) PCT No.: PCT/NL2017/050488
§ 371 (c)(1),
(2) Date: Jan. 18, 2019

(87) PCT Pub. No.: WO2018/016954
PCT Pub. Date: Jan. 25, 2018

(65) Prior Publication Data
US 2019/0239524 A1 Aug. 8, 2019

(30) Foreign Application Priority Data
Jul. 21, 2016 (NL) ........................ 2017205

(51) Int. Cl.
*A22C 11/00* (2006.01)
*A23P 20/18* (2016.01)
(Continued)

(52) U.S. Cl.
CPC .......... *A22C 11/008* (2013.01); *A22C 11/029* (2013.01); *A22C 17/0093* (2013.01);
(Continued)

(58) Field of Classification Search
CPC ... A22C 11/00; A22C 11/0209; A22C 11/029; A22C 17/0093; A22C 11/008; A23L 13/65; A23V 2002/00; A23P 20/10; A23P 20/18
(Continued)

(56) References Cited

U.S. PATENT DOCUMENTS 4,414,707 A * 11/1983 Koken ................. A22C 11/003
452/50
5,050,491 A * 9/1991 Thompson ........... A22C 11/001
99/483

(Continued)

FOREIGN PATENT DOCUMENTS

| JP | 1141556 A | 6/1989 |
|----|-----------|--------|
| WO | 2006020117 A2 | 2/2006 |
| WO | 2007032678 A1 | 3/2007 |

OTHER PUBLICATIONS

Perfectequipementsl "Perfect Enrober 36 with a Decorator", Apr. 3, 2013 (Apr. 3, 2013), p. 1, XP054977198, Retrieved from Internet: URL https://www found at youtube.com/watch?v=0kv-GhDqPe8.
(Continued)

*Primary Examiner* — Richard T Price, Jr.
(74) *Attorney, Agent, or Firm* — Workman Nydegger

(57) ABSTRACT

The invention relates to a method for applying a consumable treating liquid to an individual meat product, comprising the steps of placing an individual meat product on a carrier; moving the meat product towards a liquid applier; applying a consumable treating liquid to a meat product; forcing excess liquid towards the bottom of the meat product and/or the carrier, and controllably removing the excess liquid from the meat product and/or the carrier by a liquid remover. The invention also provides a device for applying a consumable treating liquid to an individual meat product.

24 Claims, 5 Drawing Sheets

(51) Int. Cl.
*A23L 13/60* (2016.01)
*A23P 20/10* (2016.01)
*A22C 11/02* (2006.01)
*A22C 17/00* (2006.01)

(52) U.S. Cl.
CPC .............. *A23L 13/65* (2016.08); *A23P 20/10* (2016.08); *A23P 20/18* (2016.08); *A23V 2002/00* (2013.01)

(58) Field of Classification Search
USPC .......... 452/21, 27, 30–32, 35–37, 46–48, 51
See application file for complete search history.

(56) References Cited

U.S. PATENT DOCUMENTS

| | | |
|---|---|---|
| 7,856,995 B2 | 12/2010 | Lewis |
| 2008/0254176 A1 | 10/2008 | Bontjer et al. |
| 2015/0044339 A1 | 2/2015 | Heinzen |

OTHER PUBLICATIONS

Perfect Equipments Inc.: "Chocolate coating/enrobing machines & machinery | enro-24 @ 60", Apr. 3, 2014, XP055351825, retrieved from internet https://perfectchoco.com/en/produits/large-enrober/.

* cited by examiner

METHOD AND DEVICE FOR APPLYING A CONSUMABLE TREATING LIQUID TO AN INDIVIDUAL MEAT PRODUCT, SUCH AS A SAUSAGE

CROSS-REFERENCE TO RELATED APPLICATIONS

This application is the United States national phase of International Application No. PCT/NL2017/050488 filed Jul. 19, 2017, and claims priority to Dutch Patent Application No. 2017205 filed Jul. 21, 2016, the disclosures of which are hereby incorporated in their entirety by reference.

BACKGROUND OF THE INVENTION

Field of the Invention

The present invention relates to a method for applying a consumable treating liquid to an individual meat product, such as a sausage. The present invention further relates to a device for applying a consumable treating liquid consumable to an individual meat product, such as a sausage.

Description of Related Art

In the treatment of food products, and elongated sausages in particular, often liquids are applied to the food products to treat or coat the food products with a liquid medium. For example, coextruded sausages are typically showered with a liquid smoke product to coat the sausages with a smoky tasting coating. Such system is for instance disclosed in WO 2007032678, in name of the applicant. During this showering, an excess of smoke is applied to the sausages. During transportation of the sausages in a sausage basket, the excess of smoke builds up between the basket and the sausages, which results in a locally increased concentration of liquid smoke. After drying the liquid smoke treated sausages, this concentration difference over the sausage causes discoloration of the sausages, which is undesired. Additionally, if treated sausages, with excess liquid, come into contact with machinery further down the line, also this equipment becomes stained with the liquid.

It is therefore the goal of the present invention to, at least partially, overcome the abovementioned drawbacks, and to improve the control of the application of a consumable treating liquid to an individual meat product.

SUMMARY OF THE INVENTION

The present intention thereto provides a method for applying a consumable treating liquid to an individual meat product, such as a sausage, comprising the steps of placing an individual meat product on a carrier; moving the meat product towards a liquid applier; applying a consumable treating liquid to the meat product; forcing excess liquid towards the bottom of the meat product and/or the carrier; and controllably removing the excess liquid from the meat product and/or the carrier by a liquid remover. The treating liquid may for instance be liquid smoke. The removal of excess liquid smoke from meat products such as sausages is especially beneficial, as this liquid smoke is prone to cause discolorations and pollution of other products it comes into contact with as well in that it may limit the liquid smoke consumption.

The excess liquid may be forced towards a specific location, such as the bottom, of the meat product and/or the carrier by applying a pressure on top of the meat product, e.g. by means of a gas displacer like for instance a blower. An option is to at least partially make use of gravity to force the excess liquid towards the bottom of the meat product and/or the carrier, alone or in combination with an air knife, for example. In such embodiment it is beneficial to space the application and the removal of the liquid in time, to allow for sufficient time for gravity to pull the excess liquid towards the bottom of the meat product and/or the carrier. The forcing of the liquid towards the bottom of the meat product and/or carrier may further be aided by vibrating the meat product and/or carrier during the time between application and removal of the liquid.

The excess consumable treating liquid applied to the meat product is thus forced from all over the external surface of the meat product towards the specific location, such as the bottom, of the meat product, thereby a liquid coating of a more or less controlled dimension will remain on the meat product. The excess or surplus of liquid applied to the meat product accumulates at the specific location, such as the bottom, of the meat product and/or the carrier which carries the meat product. To prevent concentration differences of treating liquid over the meat product, this excess of product is removed from the meat product and/or the carrier. The result of these steps is that a meat product is coated with a liquid layer of consumable treating liquid while substantially no remaining excess liquid is attached to the meat product or a carrier at a supporting position of the meat product. The specific location of the meat product or carrier typically is the location where the excess liquid is removed from the meat product. When the excess consumable treating liquid is removed at the bottom, the excess is forced towards the bottom. When the excess liquid is removed from the right side of the product, the excess is being forced towards the right and so on.

With excess liquid is meant that a larger amount of consumable treating liquid is applied to the meat product compared to the amount of liquid actually required to treat the meat product. The excess liquid that is removed is for instance the applied amount minus the required amount for treating or coating.

The method may further include the steps of moving the meat product from the liquid applier to a location where the excess consumable treating liquid is forced towards the specific location, such as the bottom, of the meat product and/or the carrier, e.g. a location close to one or more gas displacers. The excess liquid may subsequently be removed. During movement of the meat product from the liquid applier to a location where the excess liquid is forced towards the specific location, such as the bottom, of the meat product the applied excess liquid is for instance already given some time to displace towards the bottom of the meat product, or sausage, due to gravitational forces. The same holds for moving the meat product from location where the excess liquid is forced towards the bottom of the meat product towards the liquid remover. Also this second movement provides time in which applied excess liquid may move further downwards, towards the bottom of the meat product where it is subsequently removed by the liquid remover. In a preferred method liquid applied by the liquid applier is given between 20 and 30 seconds, and preferably even longer, to spread over the surface of the meat product naturally, due to gravitational forces.

To further facilitate the movement of excess consumable treating liquid of the meat product towards the bottom of the meat product, the meat product may be agitated on the carrier during moving the meat product from the gas displacer to the liquid remover. Agitation of the meat product on the carrier may disrupt forces holding the excess liquid on the meat product and/or the carrier, such as capillary forces between the meat product and the carrier. Such agitation could for instance be achieved by shaking and/or tilting the carrier during transportation.

The excess consumable treating liquid at the specific location, such as the bottom, of the meat product and/or the carrier may be removed by suctioning or application of an under pressure. This removal may for instance be performed by application of a vacuum knife. The under pressure may be arranged to suck the excess liquid from the meat product and/or the carrier. Suctioning or the application of an under pressure further enables the control of the removal of excess liquid. When more liquid is to be removed, the vacuum or under pressure may be increased, and vice versa. Suctioning further has the advantage that the removal may be performed at a specific location, for instance at the end of a suction nozzle. The force exerted by the liquid remover on the bottom of the meat product and/or carrier may thus be adjustable, to control the removal of excess liquid. When an vacuum knife is used, the air speeds used to suck in air are typically in the range of 0-100 m/s, preferably between 5 and 60 m/s. The air is typically sucked through a slit between two plates that extends in a direction perpendicular to the direction of transport or in the same direction as a longitudinal axis of the carrier. Such slit is typically between 1 and 5 mm wide, in particular about 3 to 4 mm.

A collector for the removed excess consumable treating liquid, e.g. in the form of a vacuum knife, may be provided with a separator, for separating air and removed excess liquid. Such collector could for instance be used to recycle the collected excess liquid smoke to the liquid applier, to reuse the removed excess liquid efficiently.

The excess consumable treating liquid may also be removed by a mechanical contact like for instance by brushing and/or scraping. Such mechanical contact is, at least compared to suctioning, a passive modus to remove the excess liquid, in which the meat product and/or the carrier are transported along the mechanical contact means to remove the excess liquid. Brushing could for instance be done by a brush, extending along the full width of a carrier. Scraping could for instance be performed by a flexible strip, extending along the width of a carrier, which is arranged to come into contact with the bottom of a carrier when such a carrier passes the strip.

The method according to the invention may further comprise the step of recycling removed excess liquid to the liquid applier. As an excess of liquid is applied to the meat product, amounts of liquid which are not kept on the meat product after liquid removal are superfluous. By returning the removed excess liquid to the liquid applier, the amount of liquid wasted in the process is reduced.

Before recycling the removed liquid to the applier, the removed liquid may be treated, for instance purified, filtered and/or separated from air. Such treatment may guarantee that the removed and treated liquid has fulfils the standards required to be used as the liquid to be applied. Use of the recycling liquid instead of or in combination with "fresh" liquid is thus possible without a detrimental effect on the quality of the resulting meat product.

The liquid used in the method according to the invention is treating liquid, and can be liquid smoke. The meat product may be a sausage. Although the method may be used for all kinds of meat products, the method is advantageously used for sausages which are coated with liquid smoke. Excess of liquid smoke on sausages causes local discolorations, or stripes, on the sausages, which are unappealing. The removal of the excess of liquid smoke overcomes this local discoloration, and thus results in a more appealing end product. As the liquid smoke is a relative costly ingredient the method according the invention may also result in a substantial cost reduction in case the access liquid smoke may be recycled.

The method may further comprise the step of drying the meat product, preferably after removal of excess liquid and/or prior to the application of the liquid. Depending on the type of meat product, and especially the type of meat, the meat product may be dried prior to applying liquid thereto. It is also possible to dry the meat product after the excess of liquid is removed. The drying is typically part of a heat treatment of the product, for instance during cooking of a sausage.

The method may for instance include the step of coextruding the meat product prior to placing the meat product on the carrier. Meat products such as sausages are typically coextruded, after which they are treated with liquid smoke to give the sausages a smoky flavour. The co-extrusion onto carriers, such as sausage baskets, allows for a continuous production process.

The liquid may be applied to the meat product by spraying, showering, atomizing, vaporizing, dipping or condensing. These applications have the advantage of a relative even distribution of liquid on the meat product. Spraying, showering, atomizing, vaporizing and condensing lead to a distribution of fine liquid particles over the surface of the meat product, which in turn reduces the amount of excess liquid applied on the meat product. Dipping has the advantage that is does not require a sprayer, shower, atomizer, vaporizer or condenser, and is a passive process in which the meat product is guided through or into a dipping bath.

A gas displacer, for example a blower, may be arranged to exert a pressure over the complete width of the carrier. The width according to the invention is considered to be the direction perpendicular to the transport direction of the carrier. The carrier may for instance be an (endless) conveyor belt, a (metal) wire mesh conveyor, a roller conveyor, a basket conveyor system, a slat conveyor, a continuous screw flight conveyor, a combination of one or more of such conveyor types or any other type of transport system for supporting meat products. By moving the carrier and associated meat product through certain stations, the meat product on the carrier is treated/processed. The processing equipment is typically extended along the width of the carrier, such that all meat products on the carrier passing the processing equipment is processed.

The excess liquid may for instance be removed from beneath the carrier and/or beneath the meat products. Since the excess liquid may accumulate at the bottom/the underside of the carrier for the meat products, the removal from beneath the carrier and/or beneath the meat products may benefit from this accumulation.

The invention further relates to a device for applying a consumable treating liquid to an individual meat product, comprising a carrier, for placing a meat product thereon; a transporter, for transporting the carrier, a liquid applier, for applying a consumable treating liquid to a meat product; a gas displacer, for applying a pressure on the meat product, to coat the meat product with the liquid and force the excess liquid towards a specific location, such as the bottom, of the meat product and/or the carrier; and a liquid remover, for controllably removing the excess liquid, located at the specific location, such as the bottom, of the meat product, from the meat product and/or the carrier.

By applying a pressure on the meat product, e.g. by means of a gas displacer, consumable treating liquid applied to the meat product is forced towards a specific location, such as the bottom, of the meat product, thereby coating the meat product with the applied liquid. The excess—or surplus—of liquid applied to the meat product then accumulates at the specific location, such as the bottom, of the meat product and/or the carrier which carries the meat product. Amongst others to prevent concentration differences of liquid over the meat product, this excess of consumable treating liquid is removed from the meat product and/or the carrier by a liquid remover. The result of these steps is that a meat product is coated with a liquid while no, or only a limited amount, remaining excess liquid is attached to the specific location, such as the bottom of the meat product. The liquid remover may for instance be a suctioning device or vacuum knife. When an vacuum knife is used, the air speeds used to suck in air are typically in the range of 0-100 m/s, preferably between 5 and 60 m/s. The air is typically sucked through a slit between two plates that extend in a direction perpendicular to the direction of transport or in the same direction as a longitudinal axis of the carrier. Such slit is typically between 1 and 5 mm wide, in particular about 3 to 4 mm.

The vacuum knife may further be provided with a separator, for separating air and removed excess liquid. Such separator could for instance be used to return the collected excess smoke to the liquid applier, to recycle the excess liquid efficiently. The liquid applier may for instance be a spraying nozzle.

The carrier may comprise an elongated basket, for instance for carrying elongated individual sausage strands. Elongated carriers—or baskets—provide the advantage that a local liquid application may be applied, in which the application is spread for instance over the complete width of a production line. Elongated baskets, in which the longitudinal axis at one moment in time coincides with the location of liquid application, may be efficiently sprayed with liquid.

The liquid remover may be arranged to agitate or move the meat product in the carrier during removal of excess consumable treating liquid, to urge excess liquid between the carrier and the meat product to the bottom of the meat product and/or carrier. Such agitation may be used to break local bonding forces between the excess liquid and the carrier or meat product, such that the excess liquid may be collected at the bottom of the meat products or carriers. The agitation of the liquid remover may be the result of a suction action on the meat product, which may be stronger compared to the suction action on the carrier. When the carrier passes the liquid remover, the meat product is kept in place temporally while the carrier keeps moving. This causes the meat product to shift on the carrier slightly, breaking possible bonding forces between the meat product and the carrier.

The consumable treating liquid may typically be a liquid smoke, and the meat product may be a sausage. The removal of excess liquid smoke from meat products such as sausages is especially beneficial, as this liquid smoke is prone to cause discolorations and pollution of other products it comes into contact with as well in that it may limit the liquid smoke consumption.

The device according to the invention may further comprise a dryer, for drying the meat product. This dryer may be located before, or upstream of, the liquid applicator and/or after, or downstream of, the liquid remover. For drying use may be made of gas (air) movement and/or temperature. Also the humidity of the drying environment may be varied. Drying has thus to be understood as a process that may be executed under variable climate conditions. Cooling may in relation to the present invention also be considered as a specific type of a process that dries the meat products. Drying the meat product may further eliminate the uneven distribution of liquid over the meat product, and further prevents liquid concentration differences over the meat product. The drying make take place before and/or after applying a consumable treating liquid to an individual meat product according the present invention, and likewise before and/or after applying a consumable treating liquid to an individual meat product the meat products may be transported through an oven.

The liquid remover may comprise a support plate, for supporting the carrier during removal of excess liquid, wherein the support plate is preferably aligned with the carrier. Such plate is for instance made from food grade material such as food grade nylon. The plate may be arranged to guide the carrier along the liquid remover. Such plate may be especially beneficial if the carrier is a long or chained carrier, which tends to lose its stiffness over a period of time. This may cause a little sagging of the carrier in the middle of the carrier or in the middle of a chain of carriers, which would cause the carriers or carrier parts in the middle to be lower compared to parts on the ends. To enable an even liquid removal of excess liquid, the support plate may support all carrier parts during liquid removal, such that the carrier is fully aligned with the liquid remover over for instance the width of the carrier or chain of carriers.

In a system for applying liquid smoke to sausages for instance, the carriers are formed of a line of elongated sausage baskets. To be able to support such carriers during transportation, and in particular during the time when the excess liquid is to be removed from the carrier, the support plate may be placed at an angle compared to the horizon. Such angle is typically in the range of 10 to 50 degrees. The support place would enable a smooth entrance of the carriers on the plate and a smooth release of the carriers after the excess liquid is removed.

The liquid applier may arranged to apply liquid with a sprayer, shower, atomizer, vaporizer, dipping bath or condenser. These applications have the advantage of an even distribution of liquid on the meat product. Spraying, showering, atomizing and vaporizing lead to a distribution of fine liquid particles over the surface of the meat product, which in turn reduces the amount of excess liquid applied on the meat product. Dipping has the advantage that is does not require a sprayer, shower, atomizer, vaporizer or condenser, and is a passive process in which the meat product is guided through or into a dipping bath.

The pressure may be exerted by forced gas displacement like for instance gas displacement provided by an air knife. An air knife has the benefit of applying a laminated flow of air to coat the meat product with the applied liquid. A further benefit is that the direction of the airflow may be adjusted by using an air knife. The gas displacement may be arranged to apply a pressure over the complete width of the carrier. This ensures that the excess liquid is urged towards the bottom of the carrier or meat product over the complete width of the carrier, which enables an efficient treatment of the meat product.

The liquid remover may be arranged underneath the meat product and/or carrier. Since the excess liquid may accumulate at the bottom of the carrier or meat product for instance due to gravity, the removal from beneath benefits from this accumulation, and is thus advantageously performed at the bottom of the meat product or carrier.

The liquid remover may comprise a treatment station, for treating the removed excess liquid. The treatment station may further be arranged to return treated liquid to the liquid applier. This way the excess liquid may be recycled in the process of for instance coating a meat product with the right amount of liquid. The treatment station may for instance comprise a separator, such as a cyclone, to separate the collected liquid from collected air. The treatment station may also comprise a filter, to filter the collected liquid from any solid particles. The treatment station could for instance be integrated into the liquid remover or vacuum knife.

BRIEF DESCRIPTION OF THE DRAWINGS

The invention will be further elucidated herein below on the basis of the non-limitative exemplary embodiments shown in the following figures. Herein FIG. 1 schematically shows a method according to the present invention.

DESCRIPTION OF THE INVENTION

Figure 1:
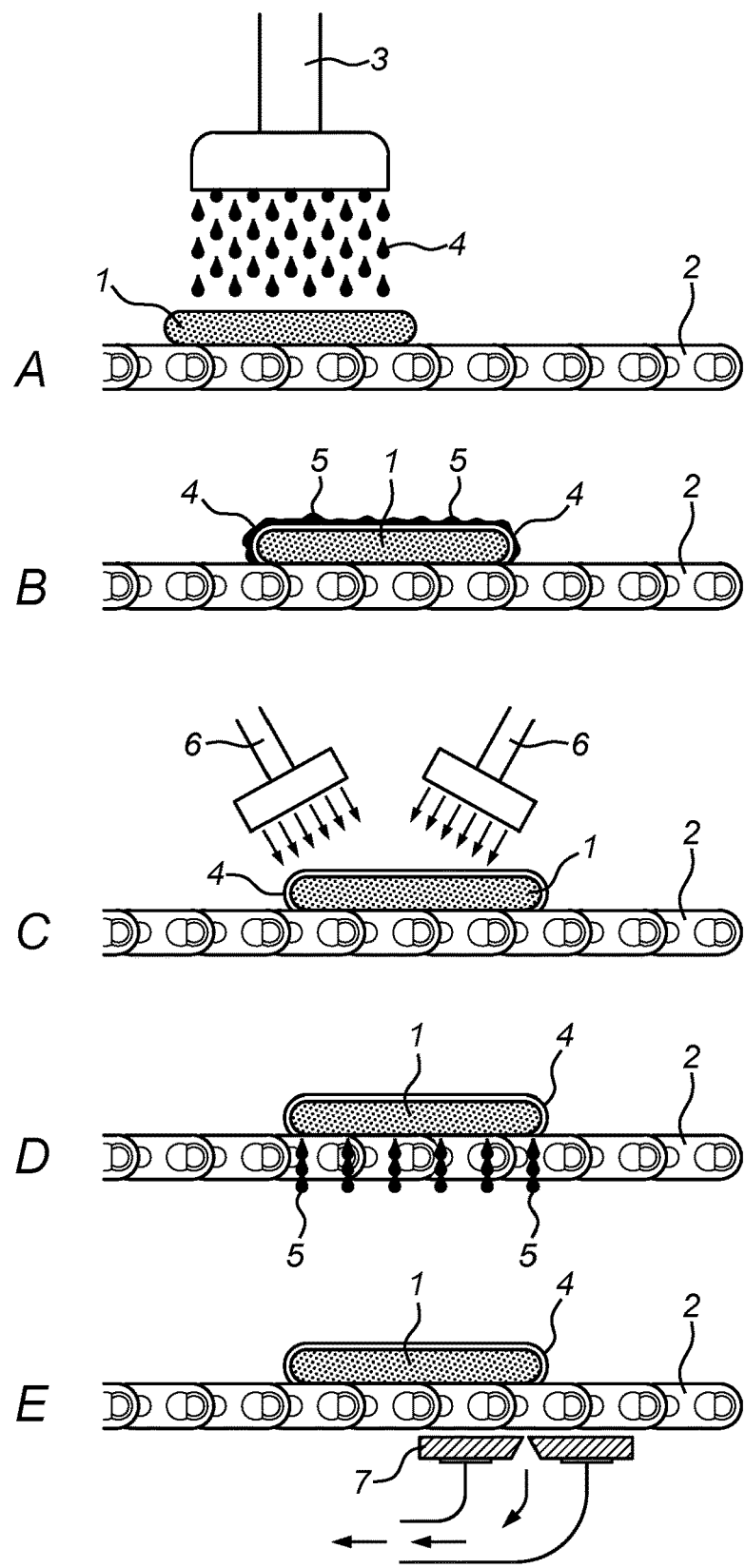

FIG. 1 schematically shows a method for applying a consumable treating liquid to an individual meat product. The method comprises the steps of placing an individual meat product (1), indicated by a sausage (1) in FIG. 1, on a carrier (2), moving the meat product (2) towards a liquid applier (3) and applying a consumable treating liquid (4) to the meat product (1), as shown at section A of FIG. 1. After the liquid (4) is applied to the meat product (1), an excess (5) of liquid (4) is present on the meat product (1), as shown at section B of FIG. 1.

In FIG. 1, the excess liquid (5) is forced towards the bottom of the meat product (1) and the carrier (2) in section C of FIG. 1. A blower (6) is applying a pressure on top of the meat product (1), and forces the present excess liquid (5) towards the bottom of the meat product. As can be seen in section D of FIG. 1, the excess liquid (5) collects at the bottom of the carrier (2) and the meat product (1), while the meat product (1) is provided with a coating of liquid consumable medium (4).

The excess liquid (5) is subsequently removed from the meat product (1) and carrier (2) by a liquid remover (7), as can be seen in section E of FIG. 1, leaving a meat product (1) coated with consumable treating liquid (4), but without excess liquid (5). The liquid remover (7) for instance applies a suction force on the excess liquid (5) to remove the excess liquid.

Figure 2:
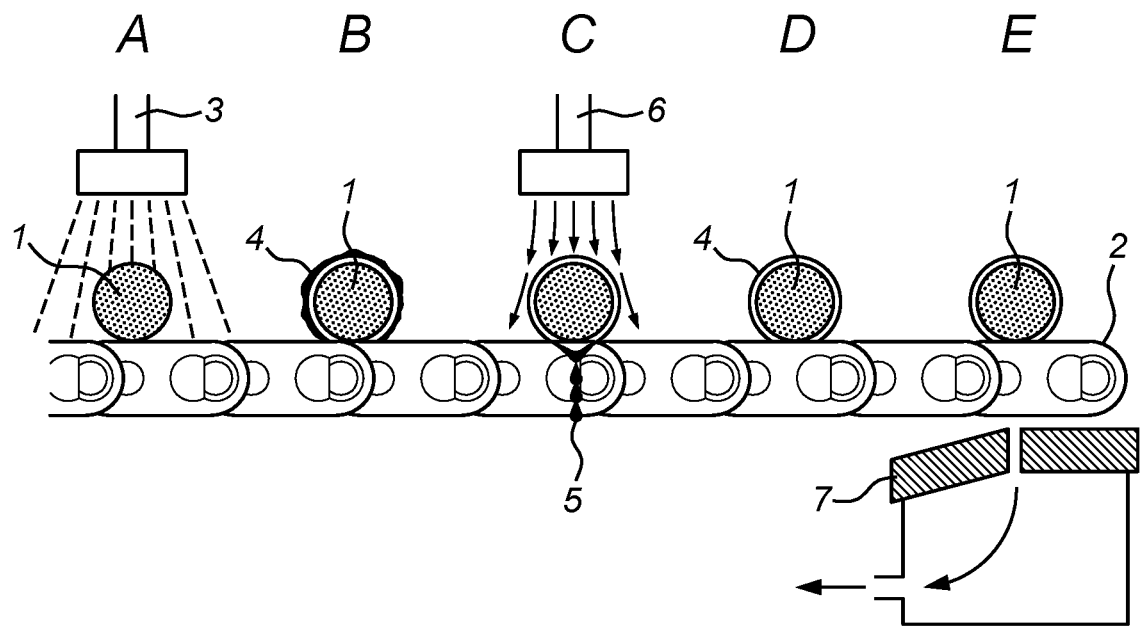
FIG. 2 schematically shows the method of FIG. 1 in subsequent steps, with a round meat product.

FIG. 2 schematically shows the method of FIG. 1 in subsequent steps, with a substantially round meat product (1).

Figure 3:
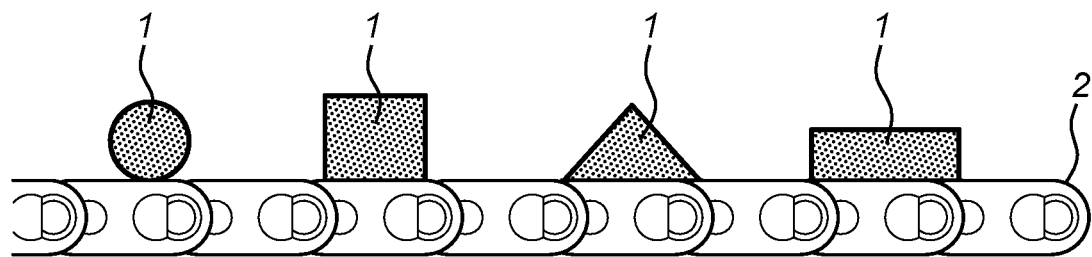
FIG. 3 schematically shows different shaped meat products on a belt conveyor

FIG. 3 schematically shows different shaped meat products (1) on a carrier (2), which carrier is shown as a belt conveyor (2).

Figure 4:
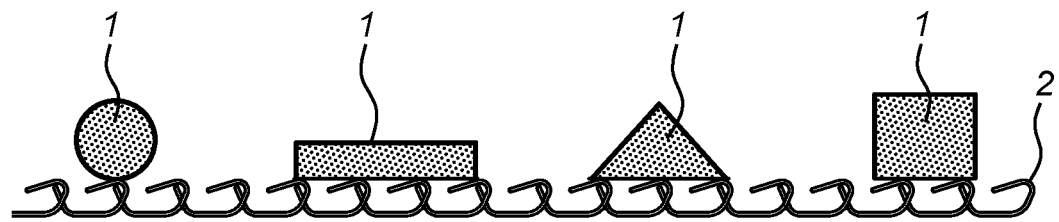
FIGS. 4 and 5 schematically show different meat products on different carriers.
Figure 5:
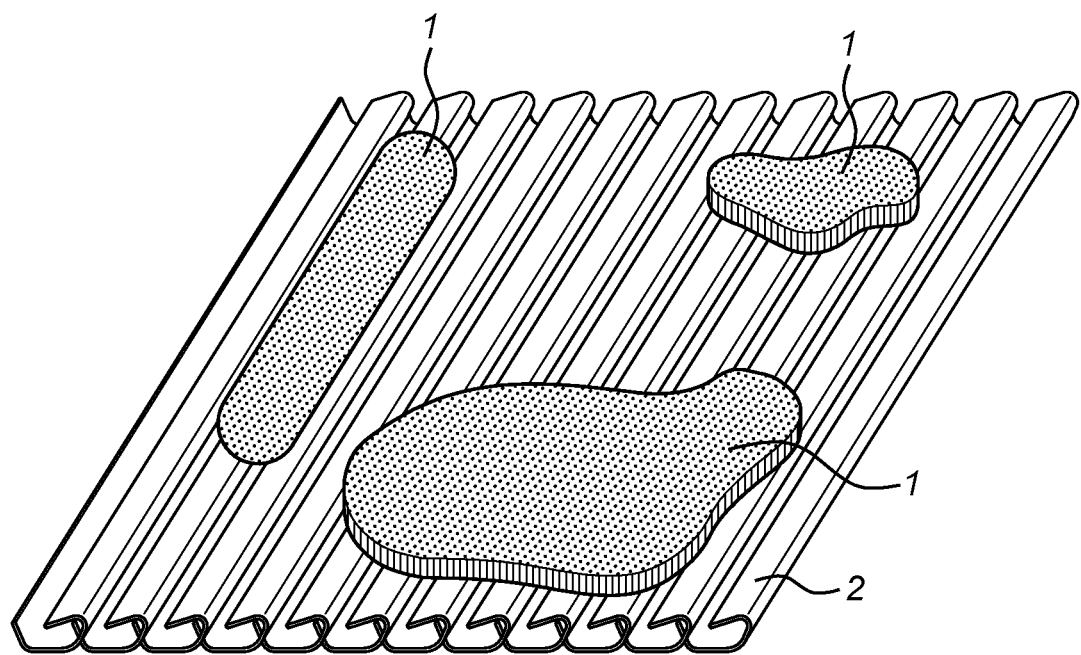

FIGS. 4 and 5 schematically show different shaped meat products (1) on another carrier (2).

Figure 6:
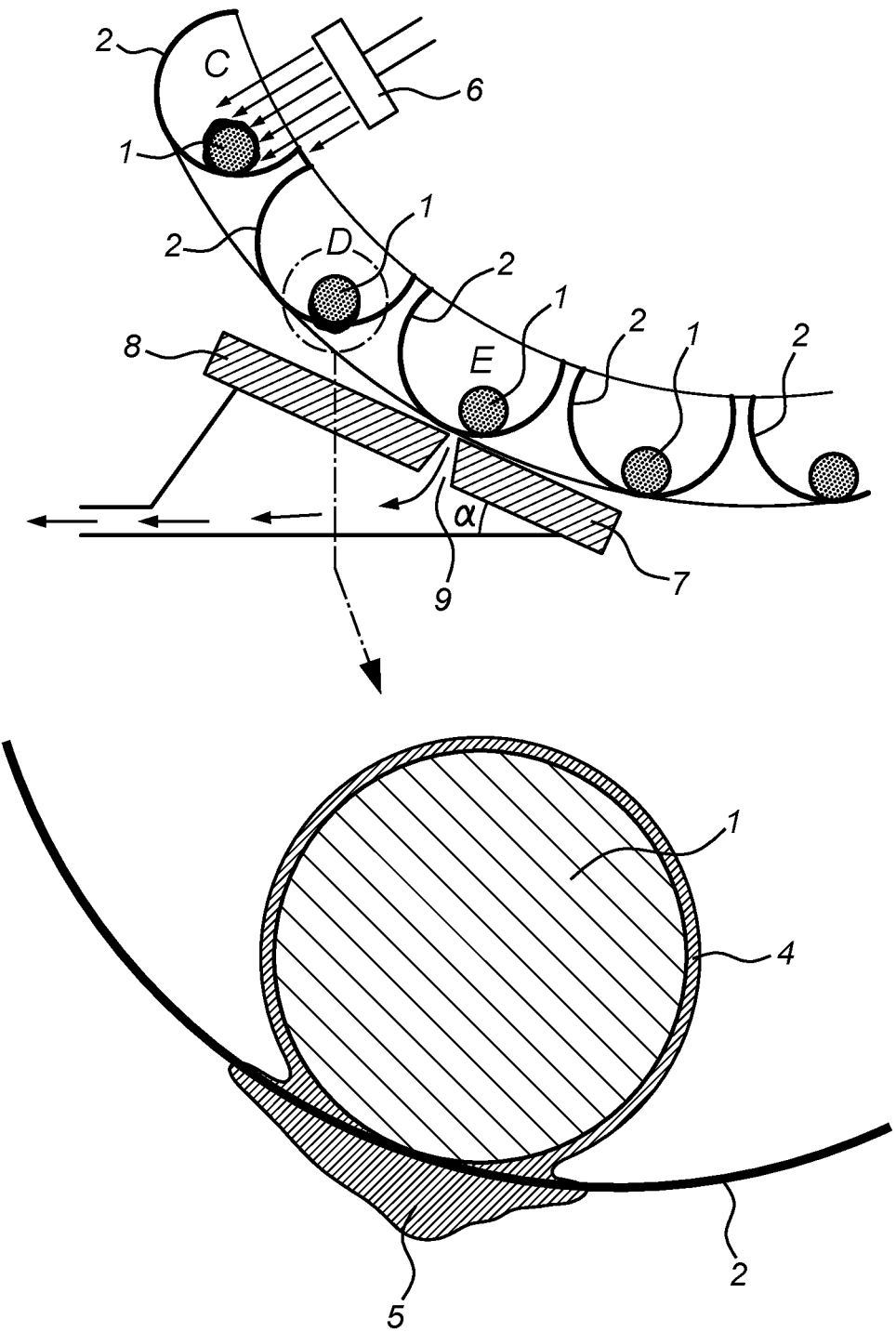
FIG. 6 schematically shows the removal of excess liquid according to the invention by suction FIGS. 7 and 8 schematically show the removal of excess liquid according to the invention mechanically.

FIG. 6 schematically shows the excess liquid (5) being forced towards the bottom of the meat product (1) and the carrier (2). A blower (6) is applying a pressure on top of the meat product (1), and forces the present excess liquid (5) towards the bottom of the meat product (1), as is best seen in the detailed view of FIG. 6. The excess liquid (5) collects at the bottom of the carrier (2) and the meat product (1), while the meat product (1) is provided with a coating of consumable treating liquid (4). The excess liquid (5) is subsequently removed from the meat product (1) and carrier (2) by a liquid remover (7), leaving a meat product (1) coated with treating liquid (4), but without excess consumable treating liquid (5). The carrier (2) of FIG. 6 is an elongated sausage basket (2), wherein the meat products (1) or sausages (1) are moved towards the liquid remover (7) is a partly rotatory fashion, or at least with a curved transport path.

The liquid remover (7) of FIG. 6 comprises a support plate (8), for supporting the carrier (2) during removal of excess liquid (5). The excess liquid (5) is removed through a slit (9) in the support plate (8). The support plate (8) is shown at an angle ($\alpha$) with the horizontal, such that the slit (9) is aligned with the bottom of the carrier (2) when excess liquid (5) is removed from the meat product (1). The liquid remover (7) for instance applies a suction force, or a lower pressure, to the excess liquid (5), to suck the excess liquid (5) through the slit (9), away from the meat product (1).

Figure 7:
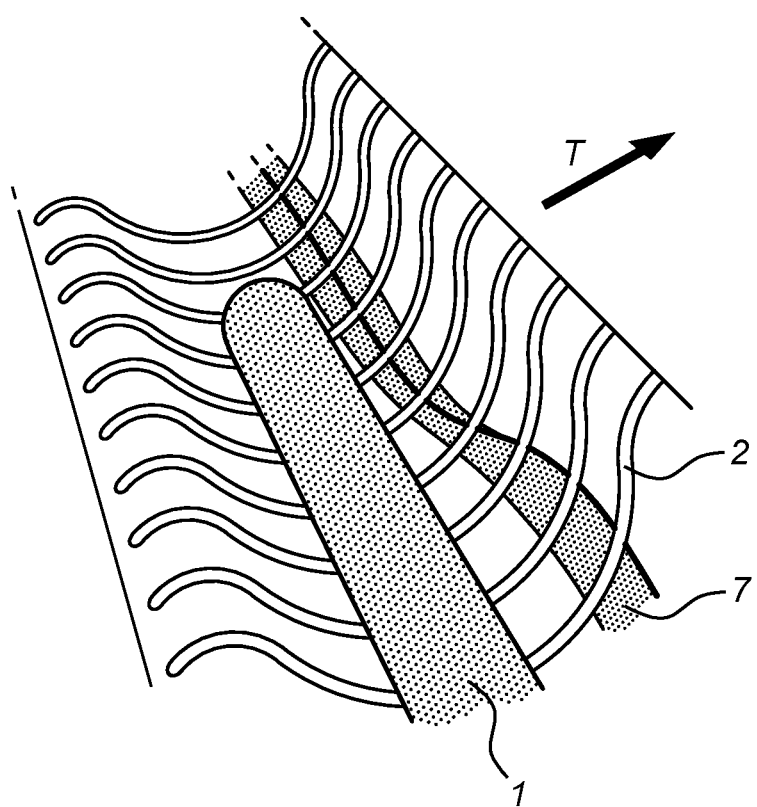
Figure 8:
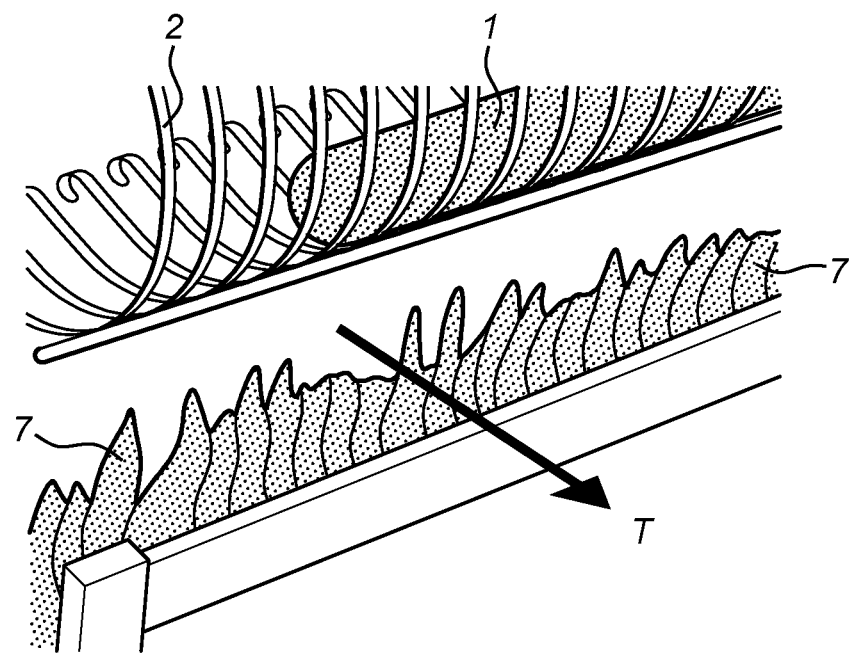

FIGS. 7 and 8 schematically show a meat product (1), represented as a sausage (1) on an elongated carrier (2), shown as a sausage basket (2). The liquid remover (7) in FIGS. 7 and 8 is shown as a mechanical remover. FIG. 7 shows a liquid remover (7) in the form of a rubber strip (7). When the basket (2) moves in transport direction (T), the strip (7) comes in contact with the bottom of the basket (2), thereby scraping of the liquid accumulated at the bottom of the sausage (1) and the basket (2). The rubber strip (7) preferably deforms at least partially, to follow the contours of the basket (2) during contact.

FIG. 8 shows a liquid remover (7) in the form of brushes (7). Similarly to the rubber strip of FIG. 7, when the basket (2) moves in transport direction (T), the brush (7) comes in contact with the bottom of the basket (2), thereby scraping of the liquid accumulated at the bottom of the sausage (1) and the basket (2).

The mechanical liquid removal may be used as an alternative to removal by suction, but may also be used in combination, for an improved removal of excess liquid from the meat product.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts may be (re)combined in order to arrive at a specific application.

The invention claimed is:

1. A method for applying a consumable treating liquid consisting liquid smoke to an individual meat product, the method comprising the steps of:
   a. placing an individual meat product on a carrier;
   b. moving the meat product towards a liquid applier;
   c. applying the consumable treating liquid to a meat product;
   d. forcing excess liquid towards a specific location at a bottom of the meat product and/or the carrier;

e. controllably removing the excess liquid from the specific location of the meat product and/or the carrier by a liquid remover.

2. The method according to claim 1, wherein step d. further includes the steps of:
 f. moving the meat product from the liquid applier to a location where excess consumable treating liquid is forced towards the specific location of the meat product and/or the carrier; and
 g. moving the meat product from the location where excess liquid is forced towards the specific location of the meat product and/or the carrier to the liquid remover.

3. The method according to claim 2, further comprising the step of agitating the meat product on the carrier during moving the meat product from the location where excess liquid is forced towards the bottom of the meat product and/or the carrier to the liquid remover.

4. The method according to claim 1, wherein the excess liquid is removed by suctioning or application of an under pressure.

5. The method according to claim 1, wherein the excess liquid is removed by mechanical contact including brushing and/or scraping.

6. The method according to claim 1, wherein the force exerted by the liquid remover on the specific location of the meat product and/or carrier is adjustable, to control the removal of excess liquid.

7. The method according to claim 1, further comprising the step of recycling removed excess consumable treating liquid to the liquid applier.

8. The method according to claim 7, wherein the removed liquid is purified, filtered or separated from air, before reuse.

9. The method according to claim 1, further comprising the step of drying the meat product after removal of excess liquid and/or prior to the application of the liquid.

10. The method according to claim 1, comprising the step of coextruding the meat product prior to placing the meat product on the carrier.

11. The method according to claim 1, wherein the consumable treating liquid is applied by spraying, showering, atomizing, vaporizing, dipping or condensing.

12. The method according to claim 1, wherein a pressure is exerted over a complete width of the carrier at the location where excess liquid is forced towards the specific location of the meat product and/or the carrier.

13. The method according to claim 1, wherein the excess liquid is removed from beneath the carrier and/or meat product.

14. A device for applying a consumable treating liquid consisting liquid smoke to an individual meat product, the device comprising
 a. a carrier, for placing a meat product thereon;
 b. a transporter, for transporting the carrier;
 c. a liquid applier, for applying a consumable treating liquid to a meat product;
 d. a gas displacer, for applying a pressure on the meat product, to coat the meat product with the liquid and force the excess liquid towards a specific location at a bottom of the meat product and/or the carrier; and
 e. a liquid remover, for controllably removing the excess liquid, located at the bottom of the meat product and/or the carrier.

15. The device according to claim 14, wherein the carrier comprises an elongated basket for carrying elongated individual sausage strands.

16. The device according to claim 14, wherein the liquid remover is arranged to agitate or move the meat product in the carrier during removal of excess liquid, to urge excess liquid between the carrier and the meat product to the specific location of the meat product and/or carrier.

17. The device according to claim 14, comprising a dryer, for drying the meat product.

18. The device according to claim 14, wherein the liquid remover comprises a support plate, for supporting the carrier during removal of excess liquid, wherein the support plate is aligned with the carrier.

19. The device according to claim 14, wherein the liquid applier is arranged to apply liquid with a sprayer, shower, atomizer, vaporizer, dipping bath or condenser.

20. The device according to claim 14, wherein the gas displacer is an air knife.

21. The device according to claim 14, wherein the gas displacer is arranged to apply a pressure over a complete width of the carrier.

22. The device according to claim 14, wherein the liquid remover is arranged underneath the meat product and/or carrier.

23. The device according to claim 14, wherein the liquid remover comprises a treatment station, for treating removed excess liquid.

24. The device according to claim 23, wherein the treatment station is arranged to return treated liquid to the liquid applier.

\* \* \* \* \*